March 13, 1951  E. P. ESCHER  2,545,141
CONVEYER HOUSING ROTATING MEANS
Filed Oct. 25, 1947  2 Sheets-Sheet 1
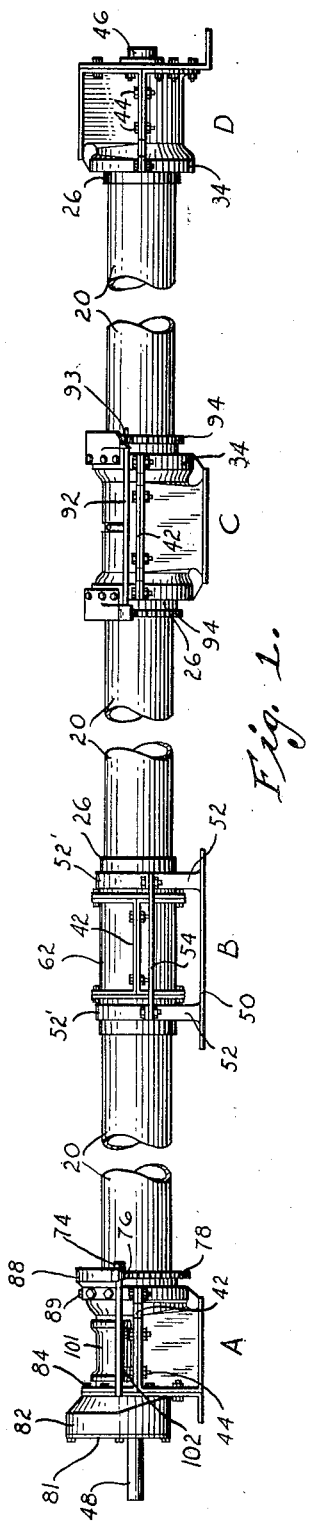
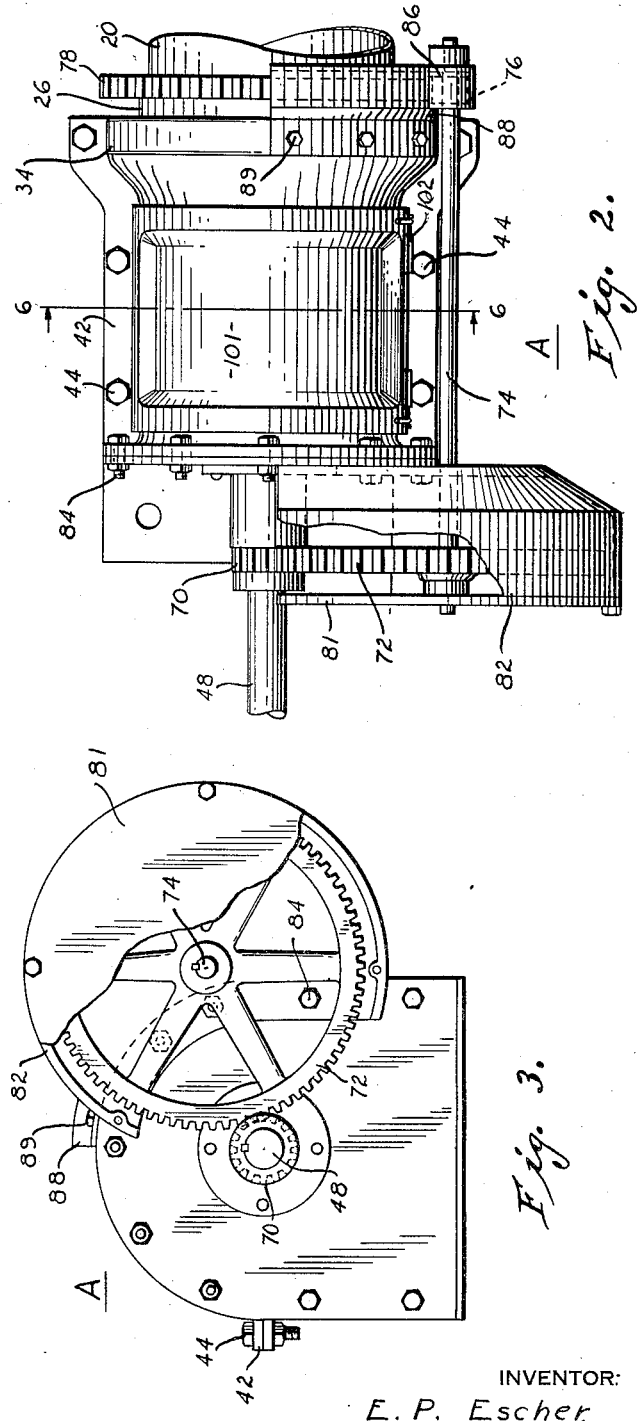
INVENTOR:
E. P. Escher
BY Chas W. Gerard
ATTORNEY INVENTOR:
E. P. Escher,
BY Chas. W. Gerard
ATTORNEY Patented Mar. 13, 1951

2,545,141

UNITED STATES PATENT OFFICE 2,545,141

CONVEYER HOUSING ROTATING MEANS

Edward P. Escher, Chicago, Ill., assignor to Screw Conveyor Corporation, Hammond, Ind., a corporation of Illinois Application October 25, 1947, Serial No. 782,153

1 Claim. (Cl. 198—213)

The present invention relates to screw conveyor apparatus, of the type in which screw conveyor mechanism operates rotatively within a cylindrical or tubular housing structure for conveying loose material therethrough, and aims to provide an improved construction and arrangement for maintaining the interior of said housing structure (forming the material passage) free of clinging material tending to adhere and form deposits on the interior of the conveyor passages.

Accordingly, an essential object of the invention is to provide improved means for producing a rotative movement of the tubular casing or housing structure for the purpose of effecting a self-cleaning operation, whereby said conveyor housing structure operates to free itself automatically of any material having a tendency to cling or adhere to the interior surfaces of the conveyor passages.

For accomplishing this general purpose of the invention I have devised a screw conveyor construction of the general character indicated in which provision is made for rotatably mounting the conveyor casing or housing portions thereof, together with means for imparting a rotative movement thereto by the operation of drive connections actuated by the rotating action of the screw conveyor mechanism itself, so that the same driving operation for actuating the conveyor mechanism is also utilized for imparting the desired rotative movement to said casing or housing structure as required for the proposed self-cleaning operation and without the necessity for any accessory or other driving means for that purpose.

It is further sought to provide means of the character described which may be embodied efficiently in screw conveyor apparatus comprising multiple sections or assemblies, including intermediate receiving or discharge units for the material at whatever intervals may be required, according to the capacity of the conveyor, or the length or travel thereof.

With the foregoing general objects in view, the invention will now be described in detail by reference to the accompanying drawings illustrating one preferred form of construction which has been found to be efficient and practical for the embodiment of the proposed improvements, after which those features and combinations deemed to be novel and patentable will be particularly set forth and claimed.

In the drawings—

Figure 1 is a general view, in elevation, illustrating a screw conveyor construction embodying the improved features of the present invention and showing the receiving and discharge ends thereof, and also an intermediate supporting or hanger unit and a spout or material discharge unit, with intervening conveyor sections partly broken away;

Figure 2 is a plan view (on a larger scale) showing one of the end supporting units of the apparatus—in this instance the discharge end as well as the drive end thereof—and illustrating the drive connections for imparting rotative movement to the conveyor casing or housing portions of the apparatus;

Figures 3 and 4 are end and side elevations, respectively, of the structure illustrated in Figure 2;

Figure 4:
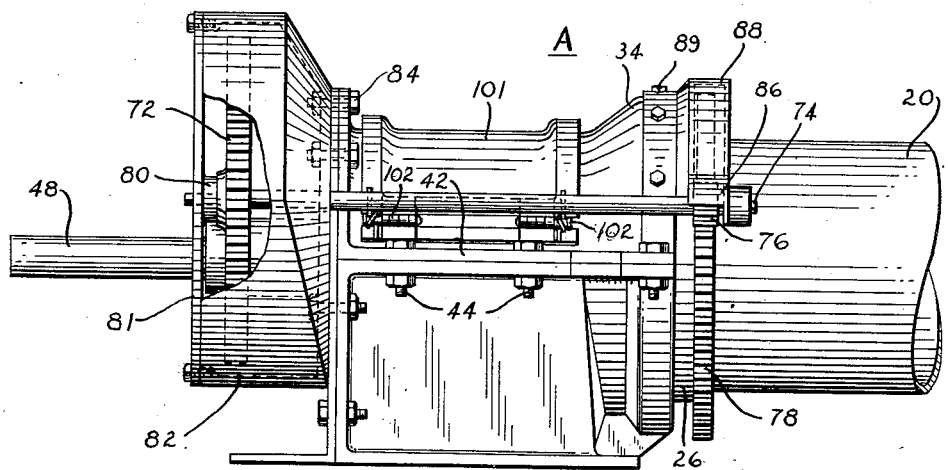

The present invention relates to improvements in the type of screw conveyor apparatus illustrated in copending application Serial No. 777,192 filed October 1, 1947. Heretofore, screw conveyor apparatus of this general type has comprised screw conveyor mechanism operating within a conveyor casing or housing structure which has been of a fixed or immovable character, only the interior screw conveying mechanism having any motion. Consequently, there has always been a tendency for the material being conveyed to settle and adhere to the interior of the conveyor passage, especially at relatively static points below the axis of the screw conveyor. Such adherence and deposit of the material has constituted a defect in the operating efficiency of conveyor apparatus of this class, and in this connection a further serious disadvantage has resulted from the opportunity afforded for infestation and consequent contamination of the total material flow passing through the conveyor.

In the companion application above referred to, means was provided for imparting a rotative movement to the conveyor housing or casing at some point intermediate the ends of the apparatus and continuing the transmission of such rotative movement throughout the length or travel of the conveyor but independently of the rotative action of the conveyor mechanism itself. In the present case, however, it is proposed to derive such rotative action by means of drive connections directly from said conveyor mechanism, as not only simplifying this driving function but establishing a more intimate and direct relationship between the principal conveyor operation and the auxiliary rotative movement of the conveyor casing or housing, thus coordinating the self-cleaning function of the housing movement with the primary conveying function of the apparatus, with all the advantages of such direct relationship.

Referring now to the accompanying drawings in detail, the improved construction is illustrated in the form of a screw conveyor construction made up of a drive end and supporting unit, indicated generally by the reference character A; an intermediate supporting standard or hanger unit, indicated generally by the reference letter B; a material discharge and hanger unit as indicated by the reference character C; and also a receiving and tail end supporting unit indicated by the reference letter D, all as represented in Figure 1 of the drawings.

The usual construction of apparatus of this type comprises an assembly of conveyor casing or housing sections 20, which in the present instance are shown as of cylindrical or tubular form for providing a cylindrical passage for the material being handled and for housing the screw conveyor which is made up of shaft sections 22 provided with ribbon conveyor flights 24 of helical design, there being a conveyor section matching each casing or housing section 20. The said cylindrical conveyor passage is continuous throughout the length of the conveyor, i. e., through the said units A, B and C, and the adjoining ends of the conveyor sections being coupled together, as more particularly shown in said copending application.

In the prevailing or standard forms of screw conveyor apparatus, the practice has been to secure the ends of the conveyor housing sections rigidly or nonrotatably to the intermediate supporting or hanger units, as well as to the end receiving and discharge units of the conveyor; in contrast to which the present improved apparatus provides the ends of the housing sections 20 with end castings or collars 26 rigidly secured thereto (see Figure 5) and formed with external grooves 28 for accommodating ball bearings 30, such ball bearing structure being provided at each of the end units A and D as well as at each side of the several intermediate units B, C etc.

For receiving the ends of the conveyor housing sections, each of the end units as well as intermediate supporting units is constructed with an enlarged mouth portion 34 for accommodating the ball bearing assemblies, and the inner margins of the collars 26 abut against the interior of said mouth portions, where suitable packing material 40 is provided for effecting a tight seal, and thereby safeguard against leakage or any contamination of the material being handled.

Each of the end units A, D, as well as the intermediate units B, C, etc., is constructed in two sections, comprising a lower base or supporting portion and an upper cap or removable portion, for the purpose of facilitating the removal or replacement of any parts in connection with inspection or repair operations. Thus the end units are shown as having their upper cap portions provided with flange margins 42 adapted to be secured by bolts 44 to similar flange portions on the remainder or base sections of the units. In the case of the unit D, the same is adapted to function as a receiving or feed unit, whereas the unit A is arranged as an outlet or discharge unit; however, the design of these units is such as to make them reversible or interchangeable in this respect. Suitable bearing structures 46 are provided for the drive end 48 for the conveyor mechanism, at the drive unit A, as represented in Figure 5, and also for the tail end of said conveyor mechanism, at the other end unit D (as indicated in Figure 1).

As illustrated in Figure 1, each intermediate supporting or hanger unit B comprises a base or foot portion 50 having upright standards 52 connected by longitudinal brace bars 54, the said standards being constructed with removable top or cap sections 52'. These standards serve to journal an intermediate conveyor housing section 62 which is of split formation as shown, and designed to constitute a tubular conveyor housing section connecting adjoining housing sections at the joint between corresponding screw conveyor sections—all as outlined in greater detail in the aforesaid copending application.

While the drive connection to the conveyor housing sections may be made at any point along the apparatus (as at one of the intermediate hanger or bearing units, as illustrated in said companion application), it is found that a more satisfactory operation is obtained by establishing a drive connection directly with the screw conveyor mechanism itself, and thereby coordinating the conveying and the housing rotating functions, and thus securing more uniform and efficient results for each particular installation.

Figure 5:
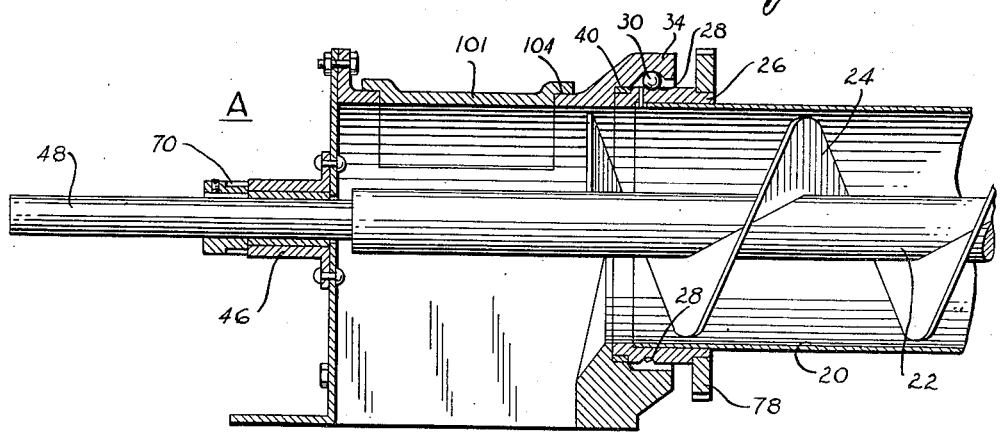
Figure 5 is a central longitudinal sectional view of the same.

Accordingly, in the present improved construction, the shaft drive end 48 (for the screw conveyor mechanism) is provided at one of the end units, as at the unit A (see Figures 2 and 3) with a drive gear or pinion 70, meshing with a gear wheel 72 which is keyed to one end of a shaft 74; and the other end of this shaft 74 is provided with a gear or pinion 76 (similar to the gear 70) designed to mesh with a ring form of gear 78 which is rigidly secured to the end casting or collar 26 of the casing or housing section 20 supported by said end unit A, as illustrated in Figure 5. One end of said shaft 74 is journaled in a bearing 80 forming part of the cover plate 81 of a combination bracket and housing member 82 which is attached by bolts 84 to said end unit, while the other end of the shaft is carried by a bearing 86 provided by a bracket or housing element 88 also attached by bolts 89 to the adjacent margin of the end unit. By this means it is obvious that the operation of the screw conveyor serves to transmit corresponding rotative action directly to the conveyor casing or housing structure, and the same provision is made (as in said copending application) for continuing said driving action on past the intermediate spout units, such as the unit C. That is, such units C are provided with a crossover drive arrangement comprising a longitudinally extending countershaft 92 provided with drive gears or pinions 93 in drive relation to ring gear elements 94 on the adjoining ends of the casing or housing sections 20 which are supported and journaled in the corresponding unit C.

With the improved construction and drive arrangement, as herein described and illustrated, it will be apparent that a continuous rotative movement will be transmitted from the drive at the unit A through the described connections to the adjacent conveyor housing section 20, and that such rotative movement will likewise be transmitted to the remaining sections of the conveyor housing throughout the length of the conveyor, in substantially the same manner as illustrated and described in the aforesaid copending application, the distinct improvement as provided by the present construction being that the said rotative action as thus transmitted to the housing units or sections takes place at all times in unison with the operation of the conveyor mechanism and always at the same predetermined rate, due to the common actuating means as represented by the drive end for producing both the operation of the conveyor mechanism and the simultaneous rotative movement of the conveyor housing structure. As a consequence, the same scavenging action results from the operation, as described in said companion application, for eliminating the tendency of the material to collect at any points along the interior conveyor passage where scaling or incrustations of the material might otherwise form, since such tendency is effectively overcome by constant dislodging of the material and subjecting the same over again to the propelling action of the conveyor mechanism. Hence, an important function and advantage is served of avoiding any opportunity for any contamination or infestation of the material or products being handled by the operation of the conveyor apparatus.

Figure 6:
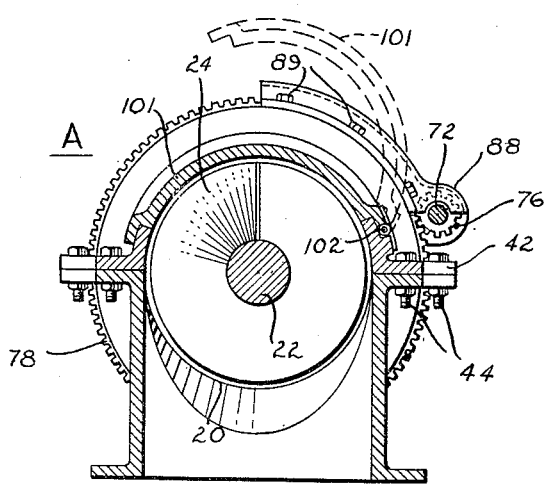
Figure 6 is a transverse sectional view thereof, representing a section taken on the line 6—6 of Figure 2.

The improved apparatus also preserves the practical advantages of a construction permitting all necessary repair or renewal of the various sections or units of the apparatus, whereby any separate or individual section or unit thereof may be properly serviced at any time without disturbing the remainder of the construction. In this connection it may also be pointed out that the end unit A is preferably provided with a movable cover or closure member 101 adapted to be maintained normally in closed position by means of a spring hinge structure 102, as shown in Figures 1 and 4. With this type of construction it will be understood that should the discharge passage become clogged for any reason (as in the case of a bin being filled to the level of the discharge outlet) the closure 101 will automatically open (as indicated by the dotted lines in Figure 6) and thereby relieve the pressure on the conveyor, by discharging the material out through the top of the unit A. Moreover this cover construction is also designed to facilitate the inspection and cleaning of the end unit and such other servicing operation as may be necessary, as in the case of the remaining supporting hanger and bearing units B and C.

Having thus described the invention, what is claimed is:

Screw conveyor apparatus comprising, a tubular conveyor housing, screw conveyor mechanism mounted for rotation within said housing, a drive end unit providing separate bearings for said conveyor mechanism and one end of said conveyor housing respectively and permitting rotative movement thereof, a drive element actuated by said screw conveyor mechanism, an external ring gear element fixed to said end of the conveyor housing, and drive connections including a shaft mounted exteriorly of said drive end unit and provided with drive transmission elements engaging said first drive element and said ring gear element respectively, whereby rotative movement is transmitted to said conveyor housing in response to the operation of said screw conveyor mechanism.

EDWARD P. ESCHER.

REFERENCES CITED

The following references are of record in the file of this patent:

UNITED STATES PATENTS

| Number | Name | Date |
| --- | --- | --- |
| 371,609 | Marr | Oct. 18, 1887 |
| 767,090 | Viola | Aug. 9, 1904 |
| 1,131,558 | Schnell | Mar. 9, 1915 |
| 1,690,000 | Fahrney | Oct. 30, 1928 |
| 1,828,984 | Schweickart | Oct. 27, 1931 |
| 2,375,699 | De. L. Sinden | May 8, 1945 |